(12) United States Patent
Kim et al.

(10) Patent No.: US 8,317,894 B2
(45) Date of Patent: Nov. 27, 2012

(54) METHOD OF PRODUCING METAL NANOPARTICLES CONTINUOUSLY AND METAL NANOPARTICLES PRODUCED THEREBY

(75) Inventors: Jaehoon Kim, Seoul (KR); Jae Duck Kim, Seoul (KR); Jong Min Park, Seoul (KR); Hong Gon Kim, Seoul (KR); Byoung Koun Min, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 154 days.

(21) Appl. No.: 12/760,450

(22) Filed: Apr. 14, 2010

(65) Prior Publication Data
US 2010/0266846 A1 Oct. 21, 2010

(30) Foreign Application Priority Data

Apr. 15, 2009 (KR) .................. 10-2009-0032906
Nov. 27, 2009 (KR) .................. 10-2009-0115867

(51) Int. Cl.
*B22F 9/24* (2006.01)
*B82Y 40/00* (2006.01)

(52) U.S. Cl. ............... 75/364; 75/369; 75/371; 977/896

(58) Field of Classification Search ..................... None
See application file for complete search history.

(56) References Cited

U.S. PATENT DOCUMENTS

| 5,997,956 A * | 12/1999 | Hunt et al. ................ 427/446 |
| 2010/0143608 A1* | 6/2010 | Ruiz et al. ................ 427/576 |
| 2010/0178227 A1* | 7/2010 | Kim et al. ................ 423/263 |

FOREIGN PATENT DOCUMENTS

| KR | 10-2009-0047877 | 5/2009 |
| WO | WO-2009/133418 A1 * | 11/2009 |

OTHER PUBLICATIONS

Taylor et al., Journal of Catalysis (2008) 259:5-16.
Kim et al., "Metal nanoparticle synthesis using supercritical alcohol," Materials Letters (2009) 63:1880-1882.

* cited by examiner

*Primary Examiner* — George Wyszomierski
(74) *Attorney, Agent, or Firm* — Morrison & Foerster LLP (57) ABSTRACT

Disclosed are a method of producing metal nanoparticles continuously, and metal nanoparticles produced thereby. The method comprises: (a) preparing a metal precursor solution by dissolving a metal precursor in alcohol; (b) continuously putting the metal precursor solution into a reactor having supercritical conditions, thereby producing metal nanoparticles; (c) cooling the solution obtained in step (b); and (d) separating and collecting the metal nanoparticles from the solution obtained in step (c).

11 Claims, 7 Drawing Sheets

METHOD OF PRODUCING METAL NANOPARTICLES CONTINUOUSLY AND METAL NANOPARTICLES PRODUCED THEREBY

CROSS-REFERENCE TO A RELATED APPLICATION

Pursuant to 35 U.S.C. §119(a), this application claims the benefit of earlier filing date and right of priority to Korean Application 10-2009-0032906, filed on 15 Apr., 2009 and Korean Application 10-2009-0115867, filed on 27 Nov., 2009, the content of which is incorporated by reference herein in its entirety.

BACKGROUND OF THE INVENTION

1. Field of the Invention

The present invention relates to a method of producing metal nanoparticles with a uniform size distribution and metal nanoparticles produced thereby, and particularly, to a method of producing metal nanoparticles continuously by using hot compressed alcohol or supercritical alcohol as a solvent.

2. Background of the Invention

Metal nanoparticles are expected to be applied to various industrial fields including electronic components/devices, catalysts, pigments, sensors, antimicrobial drugs, bactericides, condensers, paint, ink, magnetic tapes, electromagnetic wave absorbents, and medical devices, owing to their unique optical, magnetic, electrical, and chemical characteristics that are different from bulk metallic particles. Recently, the importance of these metal nanoparticles is being much emphasized.

Generally, methods for producing metal nanoparticles are categorized into a physical method and a chemical method.

The physical method includes a gas evaporation-condensation method of producing metal nanoparticles by first heating a metal under a vacuum or low pressure atmosphere thereby making the metal into gas, then by cooling and condensing the gas, an atomization method of producing metal nanoparticles by first melting a metal and then by dispersing the melted metal into gas using a spray, a mechanical grinding method using a ball milling, etc. Here, the gas evaporation-condensation method and the atomization method have an advantage to produce metal nanoparticles of a relatively uniform size and a high purity. However, the gas evaporation-condensation method and the atomize method are very expensive techniques and are not suitable for massive productions, due to complex device configurations, low yields and production rates, high energy consumption, and high production costs, etc. On the other hand, the mechanical grinding method is suitable for industrial massive productions. However, with the mechanical method, it is difficult to produce particles with high purity metal due to the impurity incorporation during the mechanical process, and it is difficult to produce uniform size metal nanoparticles due to the limitation of mechanical precision.

The chemical method includes a vapor phase reducing method of contacting vapor of a metal precursor, e.g., metal chloride with reducing agents such as hydrogen and carbon monoxide, etc., a liquid phase reducing method of producing particles by reducing a metal precursor using a reducing agent in organic solvents or aqueous solvents, an electrolysis method of producing metal nanoparticles by reducing metal ions in a solution with an alternating current or a direct current in the solution through a metal electrode, etc. Here, the vapor phase reducing method has a disadvantage that an expensive device such as a device using plasma or a chemical vapor evaporator is required. The liquid phase reducing method is a relatively simple process, but this method is not economical and often generate a large quantity of organic or aqueous wastes. In addition, the liquid phase reducing method relies on using a very toxic reducing agent and organic solvent such as hydrazine, formic acid, and boron compounds ($NaBH_4$, $LiBH_4$, $KBH_4$). Accordingly, when applying produced metal nanoparticles to cosmetics, drugs, materials to be injected into a human's body, etc., the metal nanoparticles should be purified using a very time-consuming and high cost process. The liquid phase reducing method is not environmentally friendly since a large amount of liquid organic wastes are discarded. Furthermore, when a large volume batch reactor is used for massive productions, produced nanoparticles have very non-uniform size distributions due to non-uniformity of an inner temperature of the batch reactor or the metal precursor.

The electrolysis method has disadvantages that long production time is required, productivity is very low due to a low metal precursor concentration, and high costs are required in processing waste water since strong acids such as sulfuric acid are required to be used.

Accordingly, required is a method of producing metal nanoparticles continuously at a high rate and a high yield using a simple device without using an expensive or toxic reducing agent or strong acid.

SUMMARY OF THE INVENTION

Therefore, an object of the present invention is to provide a method of producing metal nanoparticles producing that is capable of producing continuously metal nanoparticles having a high purity and a uniform size without distribution at a high rate. Other object of the present invention is to produce metal using nanoparticles without using expensive toxic reducing agents and organic solvents, or a strong acids, and metal nanoparticles produced thereby and having a high purity and a uniform size.

To achieve these and other advantages and in accordance with the purpose of the present invention, as embodied and broadly described herein, there is provided a method of producing metal nanoparticles continuously, the method comprising: (a) preparing a metal precursor solution by dissolving a metal precursor in an alcohol; (b) continuously introducing the metal precursor solution into a reactor having hot compressed or supercritical fluid conditions, thereby producing metal nanoparticles; (c) cooling the solution obtained in step (b); and (d) separating and collecting the metal nanoparticles from the solution obtained in step (c).

To achieve these and other advantages and in accordance with the purpose of the present invention, as embodied and broadly described herein, there is also provided metal nanoparticles produced by the method, wherein the metal nanoparticles have a diameter of 1 nm~500 nm, and comprise one or more metals selected from a group consisting of Cu, Ni, Ag, Au, Ru, Rh, Pd and Pt.

The present invention may have the following advantages.

Firstly, in this process, supercritical alcohol or hot compressed alcohol is used as a solvent and as a reducing agent. Thus the expensive and toxic reducing agents or strong acids are not required to be used and a user's economical and eco-friendly aspects may be enhanced.

Secondly, since a continuous production method is used, products of a uniform physical property and large-scale production can be obtained.

Thirdly, a device cost and a operating cost can be reduced due to a simple device configuration.

Fourthly, since massive productions are facilitated and the metal nanoparticles are produced at a high rate, many types of metal nanoparticles can be produced at low costs.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the Drawings.

DETAILED DESCRIPTION OF THE INVENTION

Description will now be given in detail of the present invention, with reference to the accompanying drawings.

For the sake of brief description with reference to the drawings, the same or equivalent components will be provided with the same reference numbers, and description thereof will not be repeated.

A method of producing metal nanoparticles continuously according to the present invention comprises: (a) preparing a metal precursor solution by dissolving a metal precursor in an alcohol; (b) continuously introducing the metal precursor solution into a reactor having hot compressed or supercritical fluid condition, thereby producing metal nanoparticles; (c) cooling the solution obtained in step (b); and (d) separating and collecting the metal nanoparticles from the solution obtained in step (c).

The method may further comprise washing and drying the metal nanoparticles after the step (d).

As the alcohol, one or more may be selected from a group consisting of methanol (critical pressure ($P_c$)=81 bar; critical temperature ($T_c$)=240° C.), ethanol ($P_c$=63 bar; $T_c$=241° C.), propanol ($P_c$=52 bar; $T_c$=263.9° C.), butanol ($P_c$=45 bar; $T_c$=289° C.), and pentanol ($P_c$=39 bar; $T_c$=307° C.). The present invention is not limited to this, but alcohol having the number of carbons of 1~5 is preferably used. If the number of carbons is six or more, solubility of a particle precursor may be significantly reduced.

The metal precursor may be metal compounds of one or more selected from a group consisting of Cu, Ni, Ag, Au, Ru, Rh, Pd and Pt, or a metal salt.

This metal precursor may include $Cu(NO_3)_2$, $CuSO_4$, $CuCl_2$, $Ni(NO_3)_2$, $NiCl_2$, $NiSO_4$, $AgNO_3$, $KAg(CN)_2$, $AgCl$, $Ag_2SO_4$, $AgBF_4$, $AgCN$, $Ru(NO_3)_3$, $Ru_2(SO_4)_3$, $RuCl_3$, $RhCl_3$, $Rh(NO_3)_3$, $H_3RhCl_6$, $RhPO_4$, $Rh_2(SO_4)_3$, $Pd(NO_3)_2$, $PdCl_2$, $Pd(NH_3)_4Cl_2$, $Pd(NH_3)_2Cl_2$, $Pd(NO_2)_2(NH_3)_2$, $H_2PdCl_6$, $Pt(NO_3)_2$, $H_2PtCl_6$, $PtCl_4$, $PtCl_2$, $K_2PtCl_4$, $Pt(NH_3)_2(NO_2)_2$, $Pt(NH_3)_6Cl_4$, $Pt(NH_3)_4Cl_4$, $HAuCl_4$, $AuCl_3$, $NH_4Au(CN)_2$ or $Na_3Au(SO_3)_2$. However, the present invention is not limited to this, but may include any metals that can be dissolved in alcohol.

The solution obtained by dissolving the metal precursor in alcohol may have a concentration of 0.001 mol/l~1 mol/l, preferably, a concentration in the range of 0.01 mol/l~0.5 mol/l. The present invention is not limited to this. However, if the metal precursor has a low concentration less than 0.001 mol/l, productivity is lowered, which is disadvantageous in an economical aspect. On the other hand, if the metal precursor has a high concentration more than 1 mol/l, metal nanoparticles with a large size and non-uniform size distribution can be produced, resulting in lowering quality.

As the hot compressed or supercritical fluid conditions in step (b), a reaction temperature may be in a range of 150° C.~600° C., and a reaction pressure may be in a range of 20 bar~500 bar. Preferably, the reaction temperature may be in a range of 250° C.~400° C., and the reaction pressure may be in a range of 50 bar~500 bar. If the reaction temperature is less than 150° C. or the reaction pressure is less than 20 bar, large size metal nanoparticles with nonuniform size distribution can be produced and, and the crystallinity can be lowered. On the other hand, if the reaction temperature is more than 600° C. or the reaction pressure is more than 500 bar, it is disadvantageous in an economical aspect since a high temperature and a high pressure need to be maintained.

In step (b), the reaction time may be in a range of 5 sec~10 min, preferably, 10 sec~5 min If the reaction time is less than 5 sec, crystallinity and purity can be lowered. On the other hand, if the reaction time is more than 10 min, large size metal nanoparticles with nonuniform size distribution can be produced.

In step (c), the cooling may be performed by a general cooling device such as a heat exchanger using e.g. tap water having a temperature less than 50° C.

In step (d), the separation may be performed through filtering or centrifugation.

As a pore size of a filter is selected according to a desired size of metal nanoparticles, uniform metal nanoparticles may be obtained. Alternatively, metal nanoparticles may be obtained from a solution by using a centrifugal separator.

The metal nanoparticles obtained in step (d) may have a diameter of 1 nm~500 nm, preferably of 3 nm~250 nm, and more preferably of 5 nm~100 nm. The diameter of the metal nanoparticles may be variable according to a type of metal, or by other processing factors.

In step (e), the washing may be performed with water or, one or more organic solvents selected from a group consisting of methanol, ethanol, propanol, acetone, and tetrahydrofuran. The drying may be implemented as vacuum drying, or oven drying, or freeze-drying.

The present invention also provides metal nanoparticles produced by the aforementioned method in a diameter of 1 nm~500 nm, and having one or more metals selected from a group consisting of Cu, Ni, Ag, Au, Ru, Rh, Pd and Pt. The metal nanoparticles may have a diameter of 1 nm~500 nm, preferably of 3 nm~250 nm, and more preferably of 5 nm~100 nm If the metal nanoparticles have a diameter more than 500 nm, their own characteristic such as magnetic, optical, chemical and catalytic characteristics are significantly degraded, and a distribution characteristic is degraded. Furthermore, if the metal nanoparticles have a diameter less than 1 nm, it may be difficult to process the produced particles and a distribution characteristic may be lowered due to agglomeration between the particles.

Figure 1:
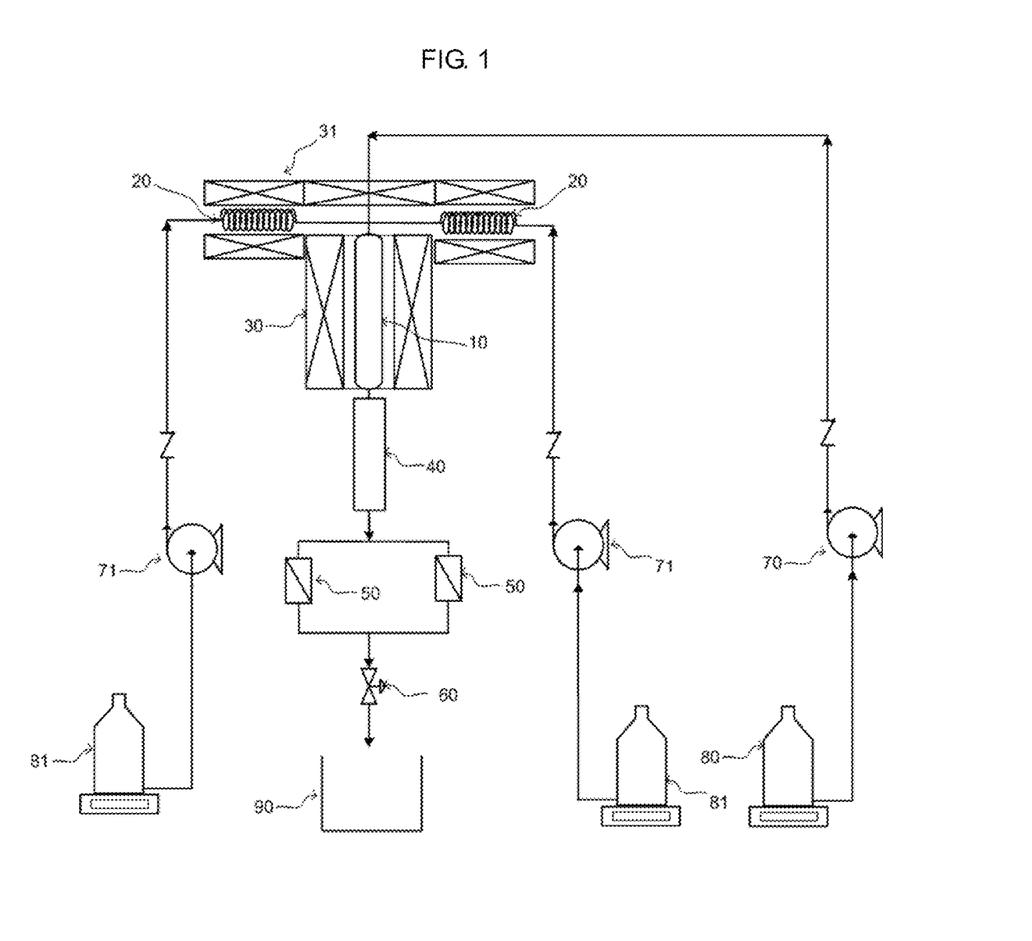
FIG. 1 is a schematic view of a to high-pressure continuous reactor system used to produce continuously produce metal nanoparticles according to the present invention.

FIG. 1 is a schematic view of a high-pressure continuous reactor system used to continuously produce metal nanoparticles according to the present invention.

The high-pressure continuous reactor system comprises a high-pressure reactor 10, high-pressure pumps 70, 71, heaters 30, 31, filter 50, a back-pressure regulator 60, a metal precursor solution storage container 80, and an alcohol storage container 81.

A method of producing metal nanoparticles according to the present invention will be explained with reference to FIG. 1.

Firstly, a metal precursor is dissolved in an alcohol, and the metal precursor solution is introduced into the metal precursor solution storage container 80. Alcohol in the alcohol storage container 81 is transferred to the high-pressure reactor 10 by the high-pressure pumps 71. Here, the temperature of the alcohol introduced into the high-pressure reactor is controlled using a pre-heater 20, the temperature of the high-pressure reactor is controlled using the heater 30, and the pressure of the high-pressure reactor is controlled using the back pressure regulator 60, thereby maintaining the alcohol introduced into the high-pressure reactor in a hot compressed or supercritical fluid state. The metal precursor solution is continuously transferred to the high-pressure reactor having an experimentally desired temperature and pressure state, and then is reacted with the alcohol which is in a hot compressed or supercritical fluid state, thereby producing metal nanoparticles. Next, the solution including the produced metal nanoparticles is cooled by the cooler 40. Then, the metal nanoparticles are separated and collected from the solution by the filter 50.

EXAMPLES

Hereinafter, the present invention will be explained in more detail with reference to Examples and Comparative Examples. These embodiments are merely exemplary, and the present invention is not limited to these embodiments. In order to observe characteristics of the metal nanoparticles obtained by the Examples and Comparative Examples, morphology of the metal nanoparticles produced according to the present invention were analyzed by a scanning electron microscopy (SEM) manufactured by Hitach. Components of the metal nanoparticles were analyzed by an X-Ray Diffraction Meter (XRD) manufactured by Rigaku.

Example 1

Methanol was pumped to the high-pressure reactor at a rate of 6 Ml/min and the pressure of the high-pressure reactor was maintained at 300 bar. $Cu(NO_3)_2$ dissolved in methanol at a concentration of 0.05 pre-heater.mol/l was then introduced into the reactor at a rate of 6 Ml/min The pressurized $Cu(NO_3)_2$ solution and methanol were mixed at a mixer having a temperature of 400° C., and then were transferred to the high-pressure reactor at a temperature of 400° C., thus to undergo a reaction for 40 sec. The produced solution including Cu nanoparticles was cooled by the cooler, and then the Cu nanoparticles were separated and collected from the solution. From the collected Cu nanoparticles, unreacted $Cu(NO_3)_2$ that may remain on the surface of the particles was extracted using a centrifugal separator. The purified Cu nanoparticles were dried in a vacuum oven having a temperature of 60° C. for one day, thereby removing the methanol.

Figure 2:
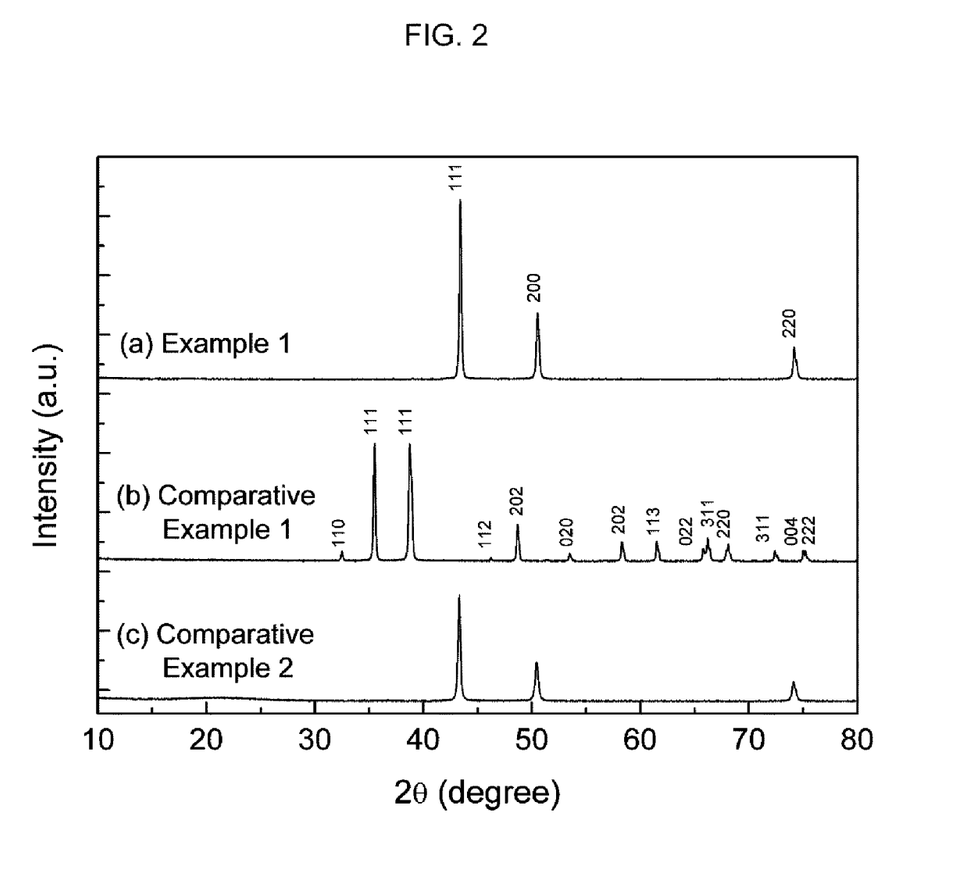
FIG. 2 is a graph showing X-Ray Diffraction (XRD) analysis results with respect to nanoparticles (a, b, c) produced according to Example 1, Comparative Example 1, and Comparative Example 2, respectively.
Figure 3:
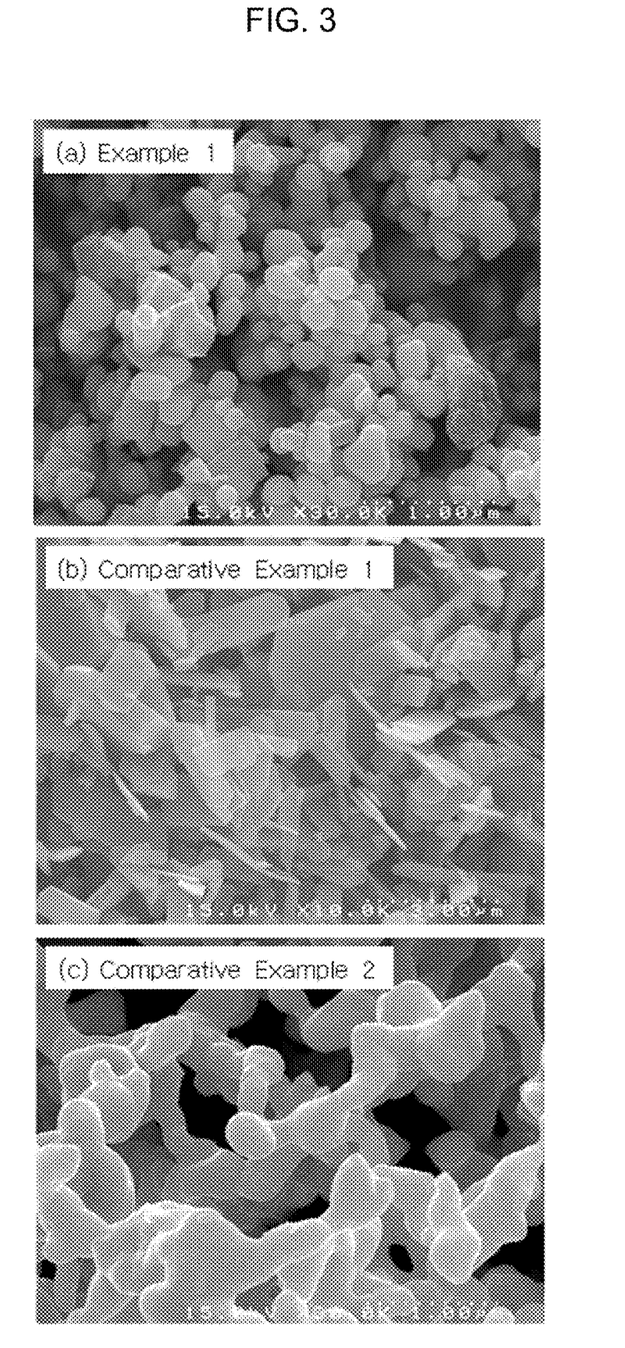
FIG. 3 shows SEM images of nanoparticles (a, c, b) produced according to Example 1, Comparative Example 1, and Comparative Example 2, respectively.

FIG. 2A shows an XRD analysis result with respect to the Cu nanoparticles produced according to Example 1, and FIG. 3A shows an SEM image of the Cu nanoparticles produced according to Example 1.

Comparative Example 1

This Comparative Example 1 was performed in the same manner as the Example 1, except that the Cu precursor, $Cu(NO_3)_2$, was dissolved in water rather than methanol, and water rather than methanol was used as the supercritical solvent, in order to compare the metal nanoparticles of the present invention with nanoparticles the particles produced by using supercritical water rather than supercritical methanol.

The produced particles were analyzed in the same manner as in the Example 1, and results thereof were shown in FIGS. 2B and 3B.

Comparative Example 2

In order to compare the metal nanoparticles produced by the continuous process of the present invention with metal nanoparticles produced by a batch process, 0.05 mol/l of $Cu(NO_3)_2$ serving as a Cu precursor was dissolved in methanol. Then, 4 Ml of the solution was introduced in a batch reactor formed from stainless steel (SUS 316). The batch reactor was put to a salt bath maintained at a temperature of 400° C., and the pressure of the reactor was maintained at 300 bar. Then, the batch reactor performed reactions for five minutes with maintaining the above conditions, thereby producing Cu nanoparticles. The Cu nanoparticles were cooled by water having a temperature of 10° C., and underwent a filtering process by the filter, thereby separating and collecting the Cu nanoparticles. The collected metal nanoparticles were washed and dried in the same manner as in the Example 1. Then, these metal nanoparticles were analyzed in the same manner as in the Example 1, and results thereof were shown in FIGS. 2C and 3C.

Comparisons between the Example 1 and the Comparative Examples 1 and 2 will be explained as follows.

As shown in FIG. 2A, Cu nanoparticles produced by using a supercritical methanol as the solvent and as the reducing agent according to the Example 1 exhibited the same peaks as own crystalline phase peaks of metallic Cu at diffraction angles of 10°~90°. On the other hand, as shown in FIG. 2B, the particles produced by using supercritical water rather than supercritical methanol according to the Comparative Example 1 exhibited the same peaks as own crystalline phase peaks of CuO at diffraction angles of 10°~90°. Accordingly, CuO was produced when supercritical water was used, whereas pure metallic Cu nanoparticles were produced when supercritical methanol was used. Furthermore, as shown in FIG. 2C, nanoparticles produced according to the Comparative Example 2 by the batch process rather than by the continuous process exhibited the same peaks as own crystalline phase peaks of metallic Cu.

Referring to FIG. 3A, Cu nanoparticles produced using supercritical methanol of the Example 1 as the solvent had a nearly spherical shape with a diameter of 50 nm~150 nm. On the other hand, referring to FIG. 3B, CuO nanoparticles produced according to the Comparative Example 1 using supercritical water rather than using supercritical methanol had various shapes, and had a size of 1,000 nm~3,000 nm.

Referring to FIG. 3C, Cu nanoparticles produced according to the Comparative Example 2 by the batch process rather than by the continuous process had a large size of 300~800 nm, and the particles were agglomerated. Accordingly, it could be observed that Cu nanoparticles having a small size and no coagulation therebetween were produced when the continuous process was used.

Example 2

This Example 2 was performed in the same manner as the Example 1 except that a metal precursor was dissolved in ethanol rather than in methanol, thereby producing Cu nanoparticles. These produced Cu nanoparticles at supercritical ethanol were analyzed in the same manner as in the Example 1, and results thereof were shown in the following table 1.

Example 3

This Example 3 was performed in the same manner as the Preferred Example 1 except that a metal precursor was dissolved in propanol rather than in methanol, thereby producing Cu nanoparticles. These produced Cu nanoparticles at supercritical propanol were analyzed in the same manner as in the Example 1, and results thereof were shown in the following table 1.

Example 4

Figure 4:
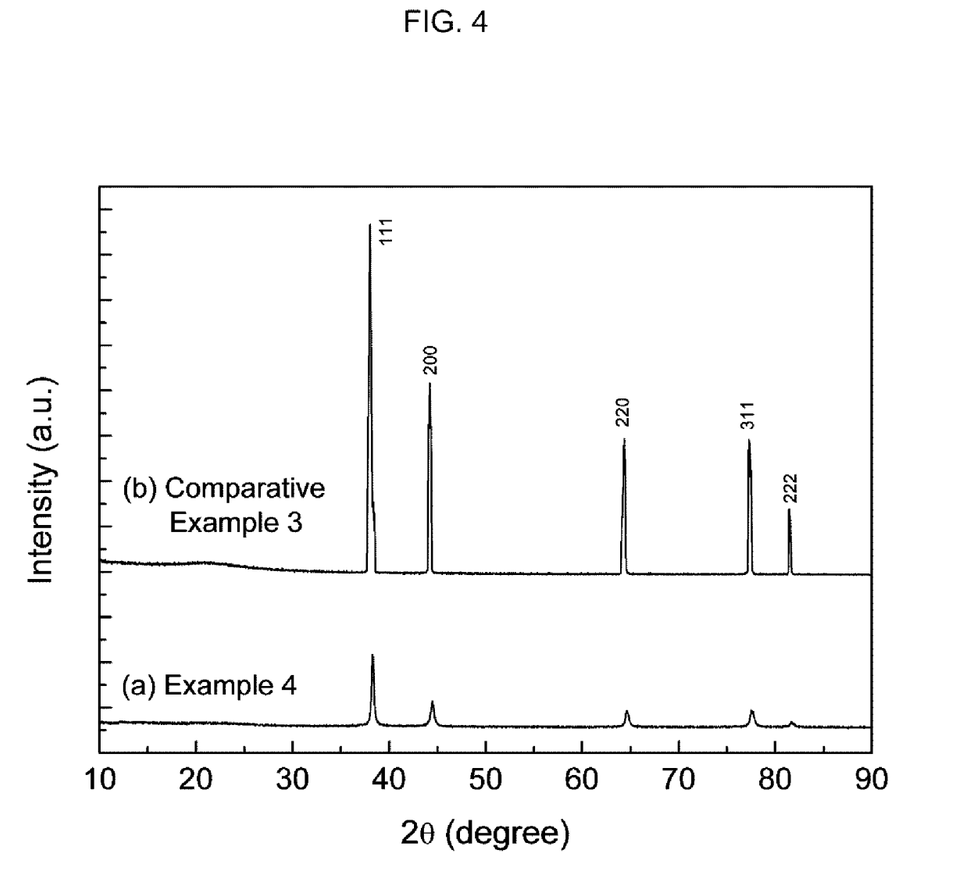
FIG. 4 is a graph showing XRD analysis results with respect to silver (Ag) nanoparticles (a, b) produced according to Example 4 and Comparative Example 3, respectively.
Figure 5:
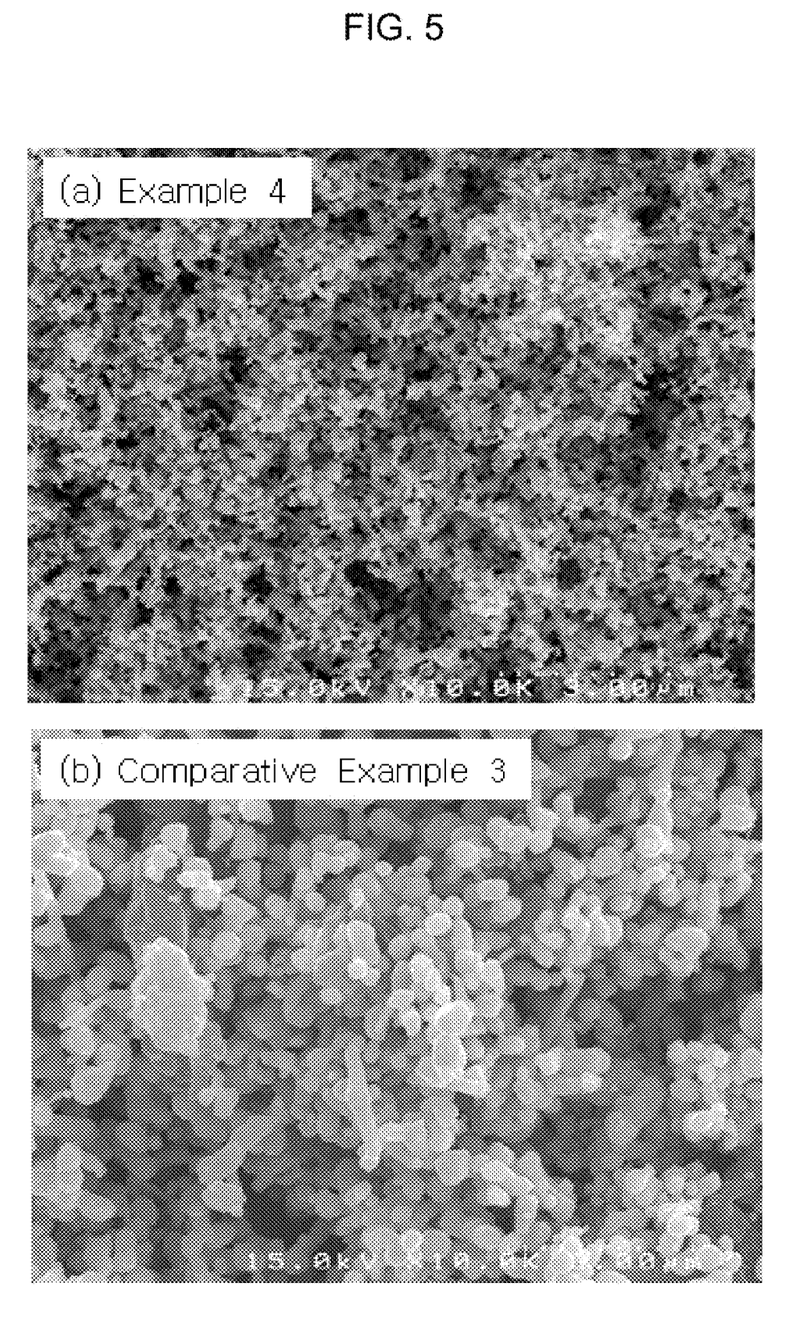
FIG. 5 shows SEM images of the silver (Ag) nanoparticles (a, b) produced according to Example 4 and Comparative Example 3, respectively.

This Example 4 was performed in the same manner as the Example 1 except that $Ag(NO_3)_2$ rather than $Cu(NO_3)_2$ were used as a metal precursor, thereby producing Ag nanoparticles. These produced Ag nanoparticles were analyzed in the same manner as in the Example 1, and results thereof were shown in FIGS. 4A and 5A and in the table 1.

Comparative Example 3

This Comparative Example 3 was performed in the same manner as the Comparative Example 2, i.e., using the batch process not by the continuous process, except that $Ag(NO_3)_2$) rather than $Cu(NO_3)_2$ were used as a metal precursor, thereby producing Ag nanoparticles. These produced Ag nanoparticles were analyzed in the same manner as in the Example 1, and results thereof were shown in FIGS. 4B and 5B and in the table 1.

As shown in FIG. 4, Ag nanoparticles produced in the Example 4 and the Comparative Example 3 exhibited the same peaks as own crystalline phase peaks of Ag at diffraction angles of 10°~90°. That is, it could be observed that Ag nanoparticles formed from the metal precursor of $Ag(NO_3)_2$ in supercritical methanol state.

Nanoparticles.

Referring to FIG. 5A, the Ag nanoparticles produced by the continuous process in the Example 4 had a nearly spherical shape, a very uniform size, and a diameter of about 40~60 nm. On the other hand, the Ag nanoparticles produced according to the Comparative Example 3 using the batch process rather than the continuous process had a very large size of 300-700 nm, and a very broad size distribution. Accordingly, it could be observed that Ag nanoparticles of a small size and a uniform size distribution were produced by the continuous process of the present invention not by processes, the batch process.

Example 5

This Example 5 was performed in the same manner as the Example 4 except that 150° C. rather than 400° C. were used as the reaction temperatures, thereby the reaction condition was conducted at hot compressed methanol phase rather at supercritical methanol phase. The produced Ag nanoparticles were analyzed in the same manner as in the Example 1, and results thereof were shown in FIG. 6 and in the table 1.

Example 6

This Example 6 was performed in the same manner as the Example 1 except that $Ni(NO_3)_2$ rather than $Cu(NO_3)_2$ were used as a metal precursor, thereby producing Ni nanoparticles. These produced Ni nanoparticles were analyzed in the same manner as in the Example 1, and results thereof were shown in FIG. 7 and in the table 1.

Figure 6:
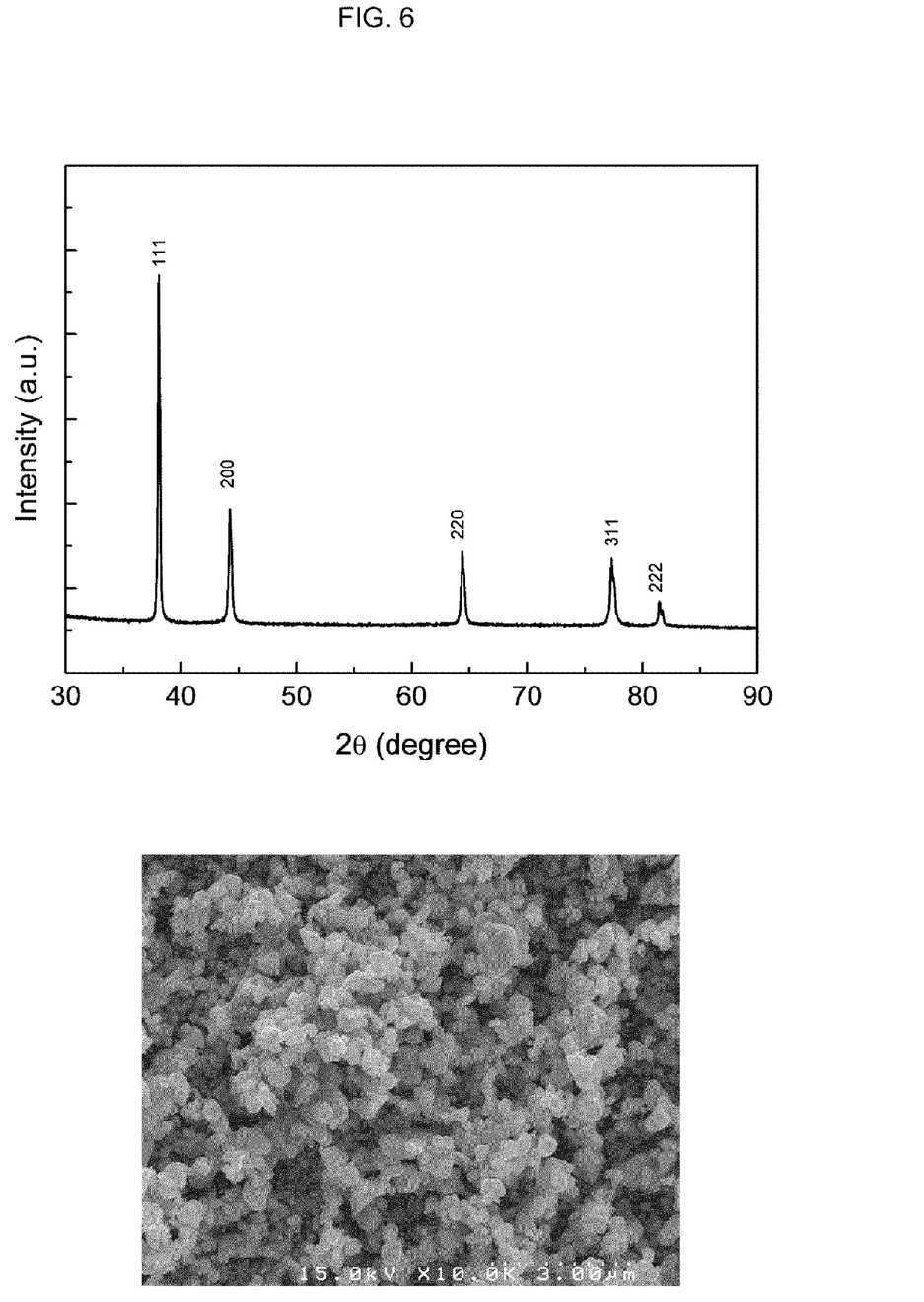
FIG. 6 shows XRD pattern and SEM image of the silver (Ag) nanoparticles produced according to Example 5.

As shown in FIG. 6, Ag nanoparticles produced in the Example 5 exhibited the same peaks as own crystalline phase peaks of Ag at diffraction angles of 10°~90°. That is, it could be observed that Ag nanoparticles formed from the metal precursor of $Ag(NO_3)_2$ in hot compressed methanol phase.

Figure 7:
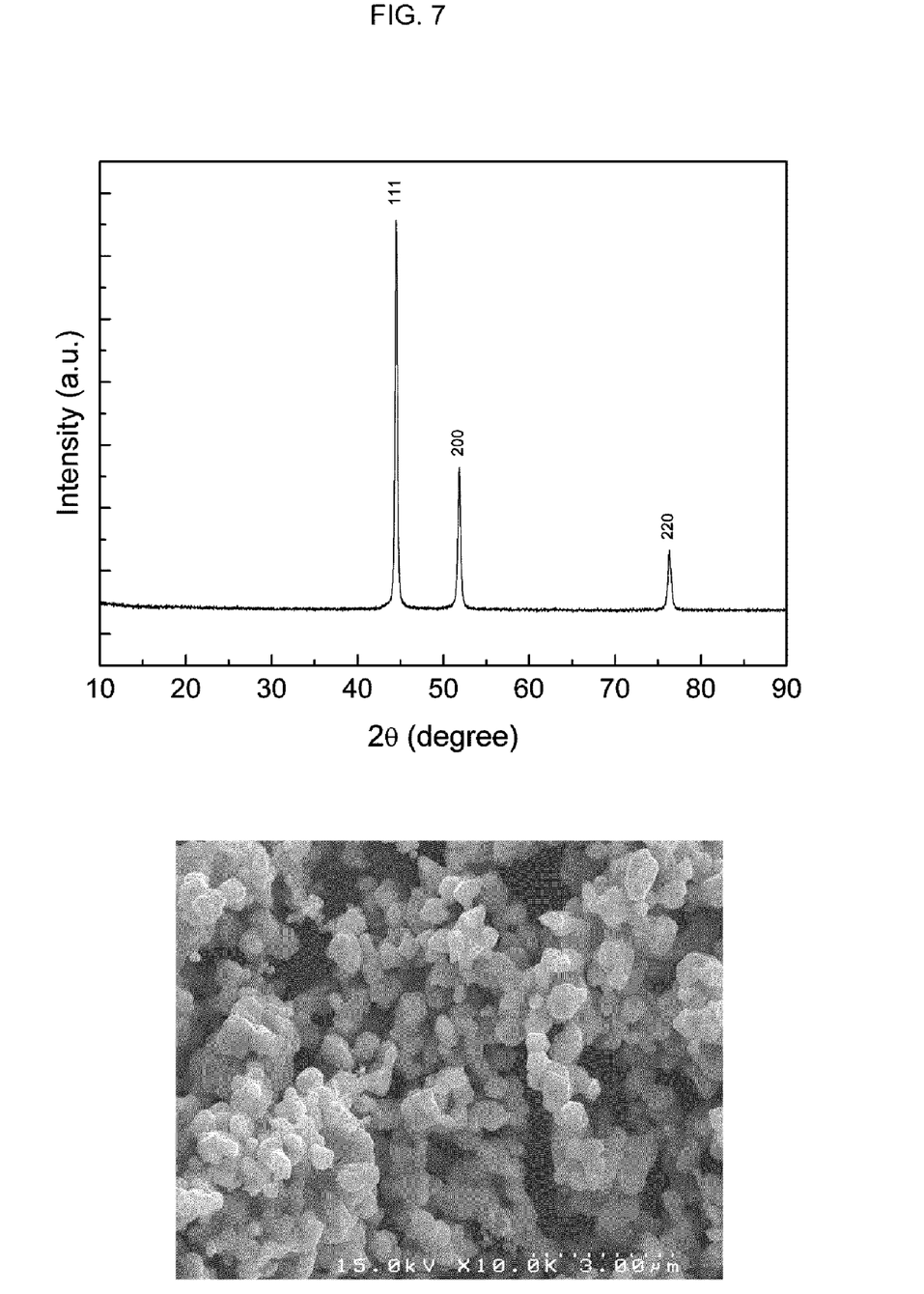
FIG. 7 shows XRD pattern and SEM image of the nickel (Ni) nanoparticles produced according to Example 6.

As shown in FIG. 7, Ni nanoparticles produced in the Example 6 exhibited the same peaks as own crystalline phase peaks of Ni at diffraction angles of 10°~90°. That is, it could be observed that Ni nanoparticles formed from the metal precursor of $Ni(NO_3)_2$ in supercritical methanol state.

TABLE 1

| Classification | Produced Nanoparticles | Solvent | Particle Diameter (nm) | Particle Shape |
| --- | --- | --- | --- | --- |
| Preferred Example 1 | Copper (Cu) | Supercritical Methanol | 50~150 | Sphere |
| Example 2 | Copper (Cu) | Supercritical Ethanol | 50~200 | Sphere |
| Example 3 | Copper (Cu) | Supercritical Propanol | 50~200 | Sphere |
| Example 4 | Silver (Ag) | Supercritical Methanol | 40~60 | Sphere |
| Example 5 | Silver (Ag) | Hot compressed Methanol | 150~500 | Sphere |
| Example 6 | Nickel (Ni) | Supercritical Methanol | 300~500 | Sphere |
| Comparative Example 1 | Copper Oxide (CuO) | Supercritical Water | 1,000~3,000 | Various |
| Comparative Example 2 | Copper (Cu) | Supercritical Methanol | 300~800 | Sphere |
| Comparative Example 3 | Silver (Ag) | Supercritical Methanol | 300~700 | Sphere |

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method of producing metal nanoparticles, the method comprising:
   (a) preparing a metal precursor solution by dissolving a metal precursor in an alcohol;
   (b) introducing the metal precursor solution into a reactor having supercritical fluid conditions, thereby producing metal nanoparticles;
   (c) cooling the solution obtained in step (b); and
   (d) separating and collecting the metal nanoparticles from the solution obtained in step (c),
   wherein the metal precursor is one or more selected from the group consisting of $Cu(NO_3)_2$, $CuSO_4$, $CuCl_2$, $Ni(NO_3)_2$, $NiCl_2$, $NiSO_4$, $AgNO_3$, $KAg(CN)_2$, $AgCl$, $Ag_2SO_4$, $AgBF_4$, $AgCN$, $Ru(NO_3)_3$, $Ru_2(SO_4)_3$, $RuCl_3$, $RhCl_3$, $Rh(NO_3)_3$, $H_3RhCl_6$, $RhPO_4$, $Rh_2(SO_4)_3$, $Pd(NO_3)_2$, $PdCl_2$, $Pd(NH_3)_4Cl_2$, $Pd(NH_3)_2Cl_2$, $Pd(NO_2)_2(NH_3)_2$, $H_2PdCl_6$, $HAuCl_4$, $AuCl_3$, $NH_4Au(CN)_2$ and $Na_3Au(SO_3)_2$.

2. The method of claim 1, further comprising washing and drying the metal nanoparticles after the step (d).

3. The method of claim 2, wherein the washing is performed by using water or, one or more organic solvents selected from a group consisting of methanol, ethanol, propanol, acetone, and tetrahydrofuran,
   wherein the drying is vacuum drying, oven drying, or freeze-drying.

4. The method of claim 1, wherein the alcohol in step (a) is one or more selected from a group consisting of methanol, ethanol, propanol, butanol, and pentanol.

5. The method of claim 1, wherein the metal precursor solution has a concentration of 0.001 mol/l to 1 mol/l.

6. The method of claim 1, wherein the supercritical conditions in step (b), a reaction temperature is in a range of 200° C. to 600° C., and a reaction pressure is in a range of 20 bar to 500 bar.

7. The method of claim 1, wherein the supercritical conditions in step (b), a reaction temperature is in a range of 250° C. to 400° C., and a reaction pressure is in a range of 50 bar to 500 bar.

8. The method of claim 1, wherein the reaction time in step (b) is in a range of 5 sec to 10 min.

9. The method of claim 1, wherein the metal nanoparticles are separated from the solution in step (d) through filtering or centrifugation.

10. The method of claim 1, wherein the metal is one or more metals selected from the group consisting of Cu, Ni, Ag, Au, Ru, Rh, and Pd.

11. The method of claim 1, wherein the metal nanoparticles obtained in step (d) have a diameter of 1 nm to 500 nm.

* * * * *